United States Patent
Kwon et al.

(12) 
(10) Patent No.: US 11,749,857 B2
(45) Date of Patent: Sep. 5, 2023

(54) HEAT-RADIATING FLUID COMPOSITION AND BATTERY MODULE COMPRISING THE SAME

(71) Applicant: LG CHEM, LTD., Seoul (KR)

(72) Inventors: Kyung An Kwon, Daejeon (KR); Moon Seok Chun, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 494 days.

(21) Appl. No.: 17/046,644

(22) PCT Filed: Dec. 20, 2019

(86) PCT No.: PCT/KR2019/018229
§ 371 (c)(1),
(2) Date: Oct. 9, 2020

(87) PCT Pub. No.: WO2020/130721
PCT Pub. Date: Jun. 25, 2020

(65) Prior Publication Data
US 2021/0184293 A1    Jun. 17, 2021

(30) Foreign Application Priority Data

Dec. 20, 2018 (KR) .................. 10-2018-0166727

(51) Int. Cl.
*H01M 10/657* (2014.01)
*H01M 50/24* (2021.01)
*H01M 50/204* (2021.01)
*H01M 50/229* (2021.01)
*H01M 50/224* (2021.01)
*H01M 50/227* (2021.01)
*H01M 10/6567* (2014.01)

(52) U.S. Cl.
CPC ..... *H01M 10/6567* (2015.04); *H01M 50/204* (2021.01); *H01M 50/224* (2021.01); *H01M 50/227* (2021.01); *H01M 50/229* (2021.01); *H01M 50/24* (2021.01)

(58) Field of Classification Search
None
See application file for complete search history.

(56) References Cited

FOREIGN PATENT DOCUMENTS

| | | | |
|---|---|---|---|
| CN | 102304351 A | | 1/2012 |
| CN | 106433903 A | * | 2/2017 |
| CN | 106433903 A | | 2/2017 |
| JP | 2004307643 A | | 11/2004 |
| JP | 2007039621 A | | 2/2007 |
| JP | 2008504125 A | | 2/2008 |
| JP | 2008098584 A | | 4/2008 |
| JP | 2011079872 A | * | 4/2011 |
| JP | 2011079872 A | | 4/2011 |

(Continued)

*Primary Examiner* — Basia A Ridley
*Assistant Examiner* — Heng M. Chan
(74) *Attorney, Agent, or Firm* — Bryan Cave Leighton Paisner LLP (57) ABSTRACT

The present disclosure relates to a heat-radiating fluid composition, a preparation method thereof, and a battery module and a battery pack including the heat-radiating fluid composition. More specifically, it relates to the heat-radiating fluid composition maintaining an excellent heat-radiating property, and the battery module and the battery pack prepared therefrom.

16 Claims, 3 Drawing Sheets

: Attached position of a temperature line

(56) References Cited

FOREIGN PATENT DOCUMENTS

| | | |
|---|---|---|
| JP | 2012193054 A | 10/2012 |
| KR | 101435608 B1 | 8/2014 |
| KR | 101599784 B1 | 3/2016 |
| KR | 20170051024 A | 5/2017 |
| KR | 20170117680 A | 10/2017 |
| KR | 20180084987 A | 7/2018 |
| KR | 20190064209 A | 6/2019 |
| WO | 2014171651 A1 | 10/2014 |
| WO | 2015025529 A1 | 2/2015 |

\* cited by examiner

[FIG. 1]

: Attached position of a temperature line

[FIG. 2]

Fluid   Heating Unit   Enclosure

HEAT-RADIATING FLUID COMPOSITION AND BATTERY MODULE COMPRISING THE SAME

The present application is a National Phase entry pursuant to 35 U.S.C. § 371 of International Application no. PCT/KR2019/018229 filed on Dec. 20, 2019, and claims priority to and the benefit of Korean Patent Application No. 10-2018-0166727 filed on Dec. 20, 2018 with the Korean Intellectual Property Office, the disclosures of which are incorporated herein by reference in their entirety.

FIELD

The present disclosure relates to a heat-radiating fluid composition, a preparation method thereof, a battery module, and a battery pack including the heat-radiating fluid composition.

BACKGROUND

A secondary battery may be said to be a core technology of smart grids which may store and charge and discharge a large capacity of electricity by connecting various types of battery cells in series and in parallel. Studies have been actively conducted in each institution in order to further increase an electric capacity of the battery, which may increase mileage of electric vehicles and facilitate the use of stored electric energy in homes and industries, thereby enriching people's lives.

However, while a power density inside the battery module is increased to raise an electric capacity of the secondary battery, there has been a thermal problem which occurs due to the high-speed charging and discharging of large-capacity energy. If heat inside the battery module is not controlled, a service life of the battery is drastically decreased while posing a risk of explosion and fire at the same time. In order to solve this problem, a high heat-radiating property is required to quickly release the heat inside the battery module. To that end, there is an air-cooling method that controls the heat by driving a fan to force air into moving from the atmosphere across the battery cell and being released out of the battery module. Due to this use of the fan, however, a volume of the module is maximized and thus causes problems such as a noise, a rise in costs and a loss of power required for driving the fan.

Accordingly, in order to replace the air-cooling method, an attempt has been made to improve a heat-radiating property by impregnating a battery cell with fluid instead of installing the fan inside the module including the battery cell.

However, if materials such as water, ethylene glycol or the like are used as the heat-radiating fluid, those materials may cause a risk of explosion of the battery cell, etc., due to a high electrical conductivity of the fluid. Thus, the fluid used includes an oil-based fluid having a high electrical insulating property. Until now, heat-transfer oils are known to include conventional engine oils, gear oils, silicone oils, mineral oils, etc. However, there has been a problem in that such fluid is not sufficient to satisfactorily radiate heat caused by repeated high-speed charging and discharging of the battery.

Accordingly, a method of mixing thermally conductive inorganic particles with the heat-radiating fluid has been attempted in order to further improve the heat-radiating property. However, over a long period of time, the inorganic particles are settled due to a weight of the inorganic particles, thereby causing a problem of remarkably reducing the heat-radiating property.

Thus, there is an urgent need to study a heat-radiating fluid composition having an excellent heat-radiating property without settling of inorganic particles which are added to maintain such heat-radiating property.

PATENT DOCUMENTS (Patent Document 0001) Korean Patent Publication No. 10-2017-0051024

SUMMARY

According to the present disclosure, there is provided a heat-radiating fluid composition having an excellent heat-radiating property while maintaining the excellent heat-radiating property even after a long period of use without settling of inorganic particles used therein.

Further, there is provided a method for preparing the heat-radiating fluid composition.

There is also provided a battery module including the heat-radiating fluid composition.

There is also provided a battery pack including the battery module.

In the present disclosure, there is provided a heat-radiating fluid composition containing:
a non-conductive oil;
5 to 200 parts by weight of a first fluid having a dielectric constant of 45 or less; and
5 to 50 parts by weight of hollow inorganic particles, based on 100 parts by weight of the non-conductive oil,
wherein the non-conductive oil and the first fluid are phase-separated. In the present disclosure, there is also provided a method for preparing the heat-radiating fluid composition, including the steps of:
(a) preparing a first mixture by mixing a non-conductive oil and 5 to 200 parts by weight of a first fluid having a dielectric constant of 45 or less, based on 100 parts by weight of the non-conductive oil;
(b) preparing a second mixture by stirring 5 to 50 parts by weight of hollow inorganic particles and 10 to 100 parts by weight of a second fluid which is miscible with the first fluid, based on 100 parts by weight of the non-conductive oil; and
(c) mixing the second mixture into the first mixture, so that a sum of the hollow inorganic particles and the second fluid is 10 to 100 parts by weight, based on 100 parts by weight of the non-conductive oil,
wherein the non-conductive oil and the first fluid are phase-separated.

There is also provided a battery module including: a module case; a battery cell mounted inside the module case; and the heat-radiating fluid composition filled in the module case.

There is also provided a battery pack including the at least two battery modules and a pack case accommodating the battery modules.

A heat-radiating fluid composition according to the present disclosure, particularly a heat-radiating fluid composition for a battery module has an excellent heat-radiating property, and at the same time, the excellent heat-radiating property may be maintained even in repeated charge and discharge cycles, because inorganic particles contained therein regardless of viscosity of the composition do not settle.

DETAILED DESCRIPTION

In the present disclosure, the terms "the first", "the second", and the like are used to describe a variety of components, and these terms are merely employed to distinguish a certain component from other components.

The terminology used herein is for the purpose of describing particular embodiments only and is not intended to be limiting of the invention. The singular forms are intended to include the plural forms as well, unless the context clearly indicates otherwise. It will be further understood that the terms "include", "have", or "possess" specify the presence of stated features, numbers, steps, components, or combinations thereof, but do not preclude the presence or addition of one or more other features, numbers, steps, components, or combinations thereof.

Also, in the present disclosure, when each layer or element is referred to as being formed "on" each of layers or elements, it means that each layer or element is directly formed on each of layers or elements, or another layer or element may be further formed between respective layers or on an object and a substrate.

As the present invention can be variously modified and have various forms, specific embodiments thereof are shown by way of examples and will be described in detail. However, it is not intended to limit the present invention to the particular form disclosed and it should be understood that the present invention includes all modifications, equivalents, and replacements within the idea and technical scope of the present invention.

(Heat-Radiating Fluid Composition)

A heat-radiating fluid composition according to one embodiment of the present disclosure includes a non-conductive oil;

5 to 200 parts by weight of a first fluid having a dielectric constant of 45 or less based on 100 parts by weight of the non-conductive oil; and 5 to 50 parts by weight of hollow inorganic particles based on 100 parts by weight of the non-conductive oil, wherein the non-conductive oil and the first fluid are phase-separated.

A heat-radiating fluid composition used in a conventional battery cooling method includes inorganic particles to improve a heat-radiating property. However, the inorganic particles are settled in the composition with an elapse of time and thus do not contribute to improving the heat-radiating property.

To solve the problem above, the heat-radiating fluid composition according to the present disclosure may contain a non-conductive oil and a first fluid as two types of fluid, which are immiscible with each other and thus phase-separated. In the present specification, "the non-conductive oil and the first fluid are phase-separated" may mean that the two fluids are immiscible with each other and divided into two separate layers. This may be confirmed by identifying that at least 90% or 95% to 100% of the two fluid layers are divided into separate layers after a certain period of time, for example, in five minutes after mixing the two fluids.

Preferably, the first fluid may be located at an upper part of the heat-radiating fluid composition, while the non-conductive oil may be located at a lower part thereof. Hollow inorganic particles present in the composition which is phase-separated as above may not be settled even after a long period of time regardless of viscosity of the fluid used and thus may contribute to improving a heat-radiating property. Accordingly, the heat-radiating fluid composition may maintain an excellent heat-radiating property despite a repeated charge and discharge of a secondary battery and thus may be suitable to be used as a battery module for secondary battery.

In addition, the heat-radiating fluid composition may further contain a second fluid which is miscible with the first fluid. At that time, a state in which the first fluid and the second fluid are miscible with each other may be confirmed by identifying that at least 50% or 80% to 100% of the two fluid layers are not divided into separate layers, but maintained as a single fluid layer after a certain period of time, for example, in five minutes after mixing the two fluids.

In particular, at least a part of the second fluid may be located in hollows of the hollow inorganic particles. The hollow inorganic particles containing the second fluid may be prepared in such a way that the second fluid permeates into the hollows of the hollow inorganic particles in a process of mixing the hollow inorganic particles with the second fluid before the non-conductive oil and the first fluid are mixed with each other. Details of this preparation will be described later.

As the second fluid is present in the hollows of the hollow inorganic particles, unlike the hollow inorganic particles without the second fluid inside the hollows, thereby preventing the hollow inorganic particles from being settled in the heat-radiating fluid composition. Further, the second fluid is miscible with the first fluid, but is immiscible with the non-conductive oil. Thus, the hollow inorganic particles may tend to be located in the first fluid, which is present at an upper part of the heat-radiating fluid composition due to the second fluid, thereby further preventing the particles settling.

Hereinafter, the heat-radiating fluid composition according to one embodiment of the present disclosure will be described in more detail for each configuration.

As described above, the non-conductive oil according to the present disclosure maintains an excellent heat-radiating performance by being phase-separated from the fluid while combining the hollow inorganic particles and the fluid so as to prevent the hollow inorganic particles from being settled. This non-conductive oil used may be an oil which has no electrical conductivity and thus shows a high electrical insulating property without causing a risk such as an explosion of cells, etc. Thus, the non-conductive oil may be a non-polar material having a dielectric constant of 5 or less.

Particularly, the non-conductive oil may be at least one selected from the group consisting of mineral oil, silicone oil and vegetable oil. The mineral oil may be aliphatic mineral oil or aromatic mineral oil. Further, the silicone oil may be silicone oil which has no hydroxyl group at the terminal of a molecule. In addition, the vegetable oil may be soybean oil, coconut oil, palm oil, cottonseed oil, camellia oil or hydrogenated oil.

Preferably, the non-conductive oil used may be silicone oil or vegetable oil. For example, the non-conductive oil may be soybean oil which may maintain an excellent heat-radiating performance while having an excellent insulating property.

Further, the first fluid used according to the present disclosure may be a thermal-conductive fluid which has a dielectric constant of 45 or less without causing an electrical problem and also has an excellent thermal conductivity by having a thermal conductivity value of 0.10 W/m·K or more, preferably 0.12 W/m·K to 0.3 W/m·K at 20° C.

Particularly, the dielectric constant of the first fluid may be 5 or more, 10 or more, or 15 or more, and 45 or less, 35 or less, or 30 or less. If the dielectric constant of the first fluid is more than 45, this fluid is irrelevant to heat-radiating performance or material property, but may cause an electrical problem such as explosion of cells, when contained in a battery module. Further, if the dielectric constant of the first fluid is too low, this fluid may not be phase-separated from the non-conductive oil and thus may not be suitable. For example, if a difference of dielectric constants between the non-conductive oil and the first fluid is 10 or more, a phase-separation may occur effectively. At the same time, if a difference of Hansen solubility parameters between the non-conductive oil and the first fluid is 4.5 $Mpa^{1/2}$ or more, preferably 5 $Mpa^{1/2}$ or more, it is preferable in that the phase-separation may occur to prevent hollow inorganic particles from being settled.

The dielectric constant is a ratio between dielectric constant of medium and dielectric constant in vacuum and may be measured at a fluid volume of 42 ml and at a temperature of 25☐ by using a dielectric constant measuring instrument (Sunraytec, model name 871).

For example, the first fluid may be ethanol, 2-propanol, or 2-methylpropanol (iso-butanol). A dielectric constant of ethanol, 2-propanol and 2-methylpropanol, which is measured by using the dielectric constant measuring instrument under the conditions above, amounts to 24.6, 18.3 and 17.3 respectively, which are suitable to be used in the heat-radiating fluid composition.

Further, the first fluid may have a density lower than that of the non-conductive oil. For example, the first fluid may have a density of 0.6 g/mol to 0.85 g/mol at 25☐ and the non-conductive oil may have a density of 0.86 g/mol to 0.95 g/mol at 25☐. Accordingly, the first fluid may be located at an upper part of the heat-radiating fluid composition and the non-conductive oil may be located at a lower part of the heat-radiating fluid composition.

This first fluid may be contained in the heat-radiating fluid composition in an amount of 5 to 200 parts by weight, 5 to 150 parts by weight, or 10 to 100 parts by weight, based on 100 parts by weight of the non-conductive oil. If a content of the first fluid is less than 5 parts by weight, there may be a problem of deteriorating the heat-radiating performance. If a content of the first fluid is more than 200 parts by weight, it is not preferable in that hollow inorganic particles may be precipitated.

Further, the hollow inorganic particles used according to the present disclosure may be at least one selected from the group consisting of silica (excluding fumed silica), alumina (excluding fumed alumina), aluminosilicate, aluminum nitride (AlN), silicon nitride ($Si_3N_4$) and boron nitride (BN). Preferably, the hollow inorganic particles may be hollow silica or hollow alumina. At that time, in case of fumed silica and fumed alumina, a diameter of hollows is so small as to be less than several nm such that the second fluid may not permeate into the hollows. Thus, the fumed silica and the fumed alumina are excluded.

Further, it is preferable in terms of improving a heat-radiating property that the hollow inorganic particles have a primary average particle diameter of 300 nm to 5 μm, 500 nm to 5 μm, or 500 nm to 3 μm, and the hollows thereof have a diameter of 50 nm to 4 μm, or 100 nm to 2 μm.

In the present specification, the primary average particle diameter of the hollow inorganic particles and the diameter of the hollows mean the average particle diameter of primary particles which are not agglomerated with each other, and the diameter of the hollows, and may be measured by using a scanning electron microscopy (SEM). Particularly, 20 particles are selected with the scanning electron microscopy, and then each particle diameter of these particles and each particle diameter of the hollows are measured with an icon bar capable of measuring a diameter, so that the primary average particle diameter and diameter of the hollows of the hollow inorganic particles may be calculated through an arithmetic average, respectively.

These hollow inorganic particles may be contained in the heat-radiating fluid composition in an amount of 5 to 50 parts by weight, 5 to 40 parts by weight, or 5 to 30 parts by weight based on 100 parts by weight of the non-conductive oil. If a content of the hollow inorganic particles is less than 5 parts by weight, there may be a problem of deteriorating the heat radiation performance. If the content of the hollow inorganic particles is more than 50 parts by weight, it is not preferable in that the hollow inorganic particle may be settled.

Further, as described above, the heat-radiating fluid composition according to the present disclosure may further contain a second fluid which is miscible with the first fluid, and at least a part or the whole of the second fluid may be located in hollows of the hollow inorganic particles. In the present specification, a state of "being miscible with the first fluid" may mean that the second fluid is not phase-separated from, but mixed with the first fluid, while being immiscible with the non-conductive oil.

Thus, it is preferable that the second fluid has a dielectric constant of 45 or less, or 15 to 45, while a difference of Hansen solubility parameters from the first fluid is less than 4.5 $Mpa^{1/2}$, preferably less than 4 $Mpa^{1/2}$, so that the second fluid is miscible with the first fluid without causing an electrical problem and thus may prevent hollow inorganic particles from being settled. Further, the second fluid may be immiscible with the non-conductive oil, if a difference of dielectric constants from the non-conductive oil is 10 or more and a difference of Hansen solubility parameters therefrom is 4.5 $Mpa^{1/2}$ or more, preferably 5 $Mpa^{1/2}$ or more.

Here, the Hansen solubility parameter is a value calculated by considering an interaction between molecules as a criterion for determining the presence of miscibility between materials, and may be represented by a total solubility parameter (Hildebrand solubility parameter, δ) as shown in the following Equation 1.

$$\delta = \sqrt{\delta_d^2 + \delta_p^2 + \delta_h^2}$$ [Equation 1]

In the Equation 1, $\delta_d$ is a dispersion component according to Van der Waals force, $\delta_p$ is a polar component related to a dipole moment, and $\delta_h$ is a hydrogen bonding component.

Thus, as a difference of Hansen solubility parameter calculated according to the Equation 1 above is smaller, it may be easier to be miscible. As the difference is larger, it may be more difficult to be miscible and thus phase-separation may occur.

Further, the second fluid may be a thermal-conductive fluid having a thermal conductivity value of 0.10 W/m·K or more, preferably 0.12 W/m·K to 0.3 W/m·K at 20□. A heat-radiating property of the heat-radiating fluid composition may be further improved in the range described above.

This second fluid used may be, for example, acetonitrile, propane-1,2-diol or 1-octanol.

Further, the first fluid and the second fluid may be the same as or different from each other. Particularly, it is preferable that the first fluid and the second fluid are different from each other, in order to minimize movement of the second fluid from the inside of hollow particles into the first fluid.

In addition, a sum of the hollow inorganic particles and the second fluid may amount to 10 to 100 parts by weight, 10 to 80 parts by weight, or 10 to 60 parts by weight in the heat-radiating fluid composition, based on 100 parts by weight of the non-conductive oil. In other words, the second fluid may be contained in the heat-radiating fluid composition in an amount of 5 to 50 parts by weight, based on 100 parts by weight of the non-conductive oil. The second fluid may tend to be miscible with the first fluid within the range described above, so as to suppress the hollow inorganic particles from being precipitated, thereby maintaining an excellent heat-radiating performance.

Meanwhile, the above-mentioned heat-radiating fluid composition may have a dispersion stability of 90% or more, which is measured to identify a degree of settling of inorganic particles with an elapse of time. At that time, the dispersion stability represents a ratio of a maximum height of a layer of precipitated particles after 30 days relative to a maximum height of a layer of particles at the time of pouring a certain amount of the heat-radiating fluid composition into a mass cylinder in percentage, and may preferably be 95% or more, more preferably 99% or more, and most preferably 100% or more. The heat-radiating fluid composition having the above-mentioned range of the dispersion stability may maintain an excellent heat-radiating property despite a repeated charge and discharge of the battery, in that inorganic particles may be prevented from being precipitated even after a long period of time.

(Method for Preparing a Heat-Radiating Fluid Composition)

According to other embodiment of the present disclosure, there is provided a method for preparing a heat-radiating fluid composition including the steps of:

(a) preparing a first mixture by mixing a non-conductive oil and 5 to 200 parts by weight of a first fluid having a dielectric constant of 45 or less, based on 100 parts by weight of the non-conductive oil;

(b) preparing a second mixture by stirring 5 to 50 parts by weight of hollow inorganic particles and 10 to 100 parts by weight of a second fluid which is miscible with the first fluid, based on 100 parts by weight of the non-conductive oil; and (c) mixing the second mixture into the first mixture, so that a sum of the hollow inorganic particles and the second fluid is 10 to 100 parts by weight, based on 100 parts by weight of the non-conductive oil.

The heat-radiating fluid composition prepared according to the preparation method described above may have excellent electrical insulating and heat-radiating properties while maintaining this excellent heat-radiating property even after a long period of use, as the non-conductive oil and the first fluid are phase-separated, and at least a part of the second fluid is located inside the hollows of the hollow inorganic particles so as to prevent the hollow inorganic particles from being precipitated in the heat-radiating fluid composition as described above.

Hereinafter, the method will be described in detail for each step. At that time, each component of the preparation method above is as described above.

The step (a) above is to mix the non-conductive oil and the first fluid in advance, in which the mixing may be performed by a conventionally known method in mixing liquids without limitation.

The step (b) above is to prepare a second mixture containing hollow inorganic particles, in which at least a part of the second fluid is located in hollows. In the step above, stirring may be performed with a ball mill and at least a part of the second fluid may enter into the hollows of the hollow inorganic particles by means of such stirring.

This stirring with the ball mill is to mix the hollow inorganic particles and the second fluid by means of mechanical friction, so that the hollow inorganic particles present in a form of aggregated secondary particles are effectively decomposed into primary particles and then come into contact with the second fluid. Thus, this stirring may improve the dispersion of the hollow inorganic particles in the heat-radiating fluid composition, while allowing the second fluid to effectively permeate into the hollows of the hollow inorganic particles.

The ball mill used in the step above may be, for example, a cylinder-type container having a metal ball therein, preferably a rotatable cylinder-type container having a metal ball therein. The metal ball is not limited to a certain type, but may preferably be a zirconia ball. Further, a particle diameter of the metal ball used may be 0.5 mm to 2 mm, or 0.5 mm to 1.5 mm, and a stirring speed of the metal ball may preferably be 100 rpm to 200 rpm. If stirring is performed with the ball mill as described above, the hollow inorganic particles of secondary particles, which are aggregates, may be easily decomposed into primary particles.

Then, in order to remove the ball used for stirring, filtering may be performed by a generally known method after the stirring so as to obtain a desired amount of the second mixture. Particularly, 10 to 100 parts by weight of the second mixture, in which at least a part of the second fluid is inserted into the hollows of the hollow inorganic particles, may contain the hollow inorganic particles and the second fluid in an amount of 5 to 50 parts by weight, respectively, based on 100 parts by weight of the non-conductive oil.

At that time, the steps (a) and (b) may be performed in a reversed order.

The step (c) is to mix the resulting first mixture and the second mixture, thereby obtaining a heat-radiating fluid composition, in which the non-conductive oil and the first fluid are phase-separated. Mixing in the step above may be performed by a method conventionally used in the art without limitation. Particularly, the second mixture may be mixed in the first mixture, so that a sum of the hollow inorganic particles and the second fluid amounts to 10 to 100 parts by weight based on 100 parts by weight of the non-conductive oil. At that time, in the sum of the hollow inorganic particles and the second fluid, the hollow inorganic particles are contained in an amount of 5 to 50 parts by weight based on 100 parts by weight of the non-conductive oil, thereby preparing a heat-radiating fluid composition in which the hollow inorganic particles are not precipitated while achieving an excellent heat-radiating performance.

(Battery Module)

Meanwhile, according to another embodiment of the present disclosure, there is provided a battery module including: a module case; a battery cell mounted inside the module case; and the above-mentioned heat-radiating fluid composition filled in the module case.

Hereinafter, the battery module according to the present disclosure will be described in more detail with reference to drawings. However, the scope of the present disclosure is not limited thereto.

Figure 1:
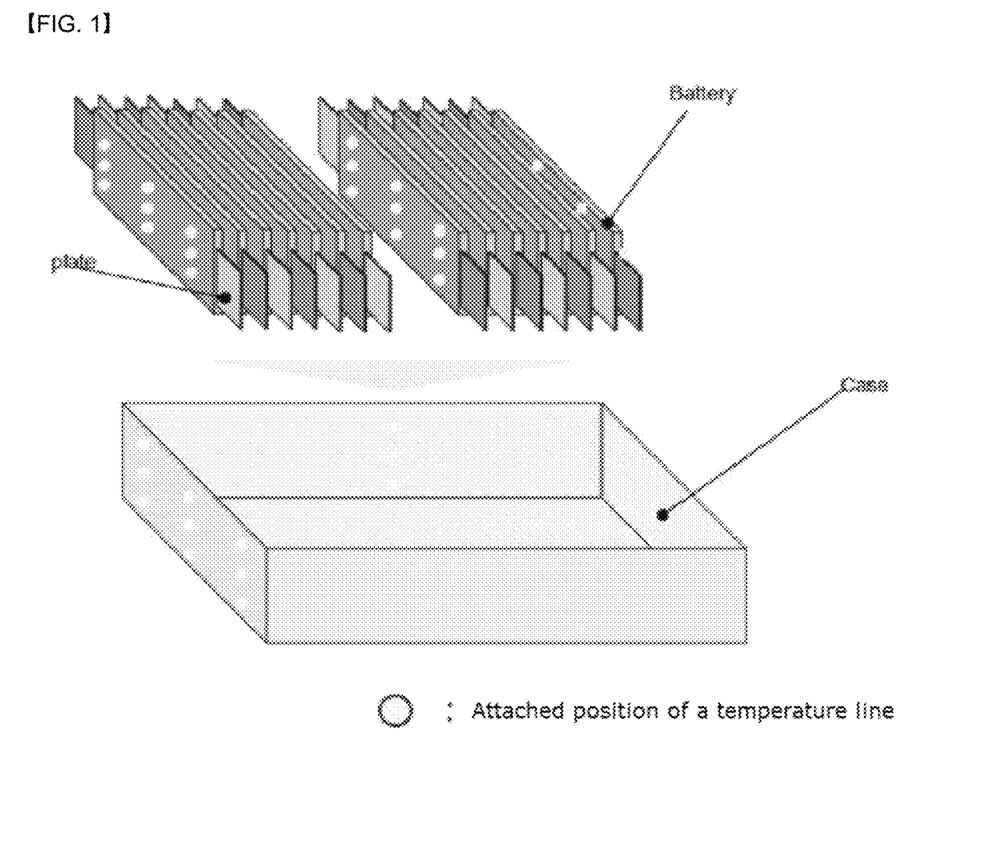
FIG. 1 is an exploded perspective view of a battery module including a module case and a battery cell according to one example.
Figure 2:
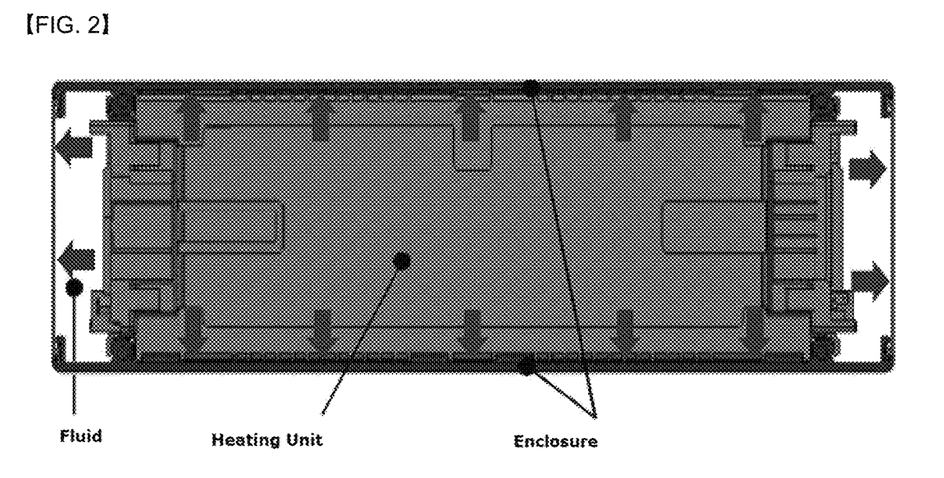
FIG. 2 is a cross-sectional view of a side of a battery module according to one example.

FIG. 1 is an exploded perspective view of a battery module including a module case and a battery cell according to one example, and FIG. 2 is a cross-sectional view of a side of a battery module according to one example.

Referring to FIG. 1, the battery module according to the present disclosure may be equipped with a battery cell and an external plate which electrically connects the battery cell with an external device (not shown) in a module case, and may have a structure in which the heat-radiating fluid composition according to the present disclosure is filled up to a certain height, if necessary, within a range of 90% or less of an internal height of the module case, though not shown in the drawing. Further, in order to identify a heat-radiating property of the heat-radiating fluid composition according to examples described below, a temperature line may be attached to several positions of the module case and the battery cell, so that a temperature inside the module can be measured during charge and discharge.

At that time, the module case used may be aluminum, plastic, stainless steel, or a combination of two or more thereof. For example, the module case used may be also polyethylene terephthalate (PET) with excellent heat-radiating performance, aluminum with excellent durability and easy transportability, or the like. Further, the heat-radiating fluid composition may be filled up to 90% or less, or 30% to 80% of an entire height inside the module case.

In addition, referring to FIG. 2, the battery module according to the present disclosure may have a structure in which a battery cell, i.e., a heating unit is mounted inside a module case, i.e., an enclosure and the above-mentioned heat-radiating fluid composition is filled in a remaining space. In this drawing, an arrow direction means a direction of heat radiating.

The battery cell may have a maximum voltage of less than 65V, or 20V to 55V. If the battery cell satisfies the above-mentioned range, an electric problem caused by a high voltage may not occur.

(Battery Pack)

Meanwhile, according to another embodiment of the present disclosure, there is provided a battery pack including the at least two aforementioned battery modules; and a pack case accommodating the battery modules. The battery pack according to the present disclosure has a high electrical insulating property and heat, which is a cause of battery explosion, is rapidly released. Moreover, the hollow inorganic particles of the heat-radiating fluid composition contained in the battery cell are not precipitated despite a repeated charge and discharge, so that the battery pack may maintain an excellent heat-radiating property.

The battery pack may include 2 to 30, or 5 to 20 battery modules described above and may achieve both an excellent electrical property and an excellent heat-radiating performance within the range above.

Hereinafter, preferred Examples will be suggested for better understanding of the present disclosure. However, the following Examples are provided only for the purpose of illustrating the present disclosure, and thus the present disclosure is not limited thereto.

EXAMPLES

Example 1

Figure 4:
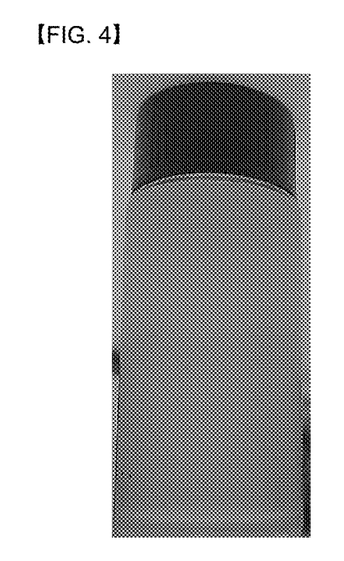
FIG. 4 is a photograph showing a heat-radiating fluid composition prepared in Example 1.

Ethanol was added at room temperature into soybean oil (Beksul soybean oil, manufactured by CJ CheilJedang Corp.) contained in a 1 L cylinder-type reactor in an amount of 50 parts by weight based on 100 parts by weight of the soybean oil. In about five minutes later, it was identified that the resulting solution was phase-separated into different layers, thereby preparing a first mixture. Hollow silica particles (manufactured by LG Chem Corp.), of which a primary average particle diameter is 1 μm and a diameter of hollows is 600 nm, were added into another 1 L cylinder-type reactor containing 1 kg of zirconia balls having a particle diameter of 1 mm in an amount of 30 parts by weight and acetonitrile (Hansen solubility parameter: 24.4 $MPa^{1/2}$) was added thereto in an amount of 30 parts by weight based on 100 parts by weight of the soybean oil. Then, the resulting solution was stirred with a ball mill at 200 rpm for two hours. After stirring, a second mixture was obtained through filtering, and mixed with the first mixture to prepare a heat-radiating fluid composition, a photograph of which is shown in FIG. 4. Referring to FIG. 4, it might be confirmed that the prepared heat-radiating fluid composition was phase-separated into the ethanol (density: 0.789 g/ml, Hansen solubility parameter: 26.5 $MPa^{1/2}$) at an upper part thereof and into the soybean oil (density: 0.917 g/ml, Hansen solubility parameter: 16 $MPa^{1/2}$) at a lower part thereof. Further, the viscosity of the composition was 500 cP at 20□ and 320 cP at 30□. At that time, the viscosity was measured with a 15.5 g of a specimen in a spindle SC4-27 at 50 rpm by using a DV-II+Pro, RV model equipment of Brookfield Corp.

Example 2

A heat-radiating fluid composition was prepared in the same manner as in Example 1, except for using hollow alumina (manufactured by LG Chem Corp.), of which a primary average particle diameter is 1 μm and a diameter of hollows is 500 nm, instead of the hollow silica used in Example 1 above. The viscosity of the prepared heat-radiating fluid composition was 470 cP at 20□ and 300 cP at 30□.

Example 3

A heat-radiating fluid composition was prepared in the same manner as in Example 1, except for using 2-propanol instead of the ethanol used in Example 1 above. The prepared heat-radiating fluid composition was phase-separated into the 2-propanol (density: 0.786 g/ml, Hansen solubility parameter: 23.6 $MPa^{1/2}$) at an upper part thereof and into the soybean oil (density: 0.917 g/ml) at a lower part thereof, and the viscosity of the composition was 530 cP at 20□ and 460 cP at 30□.

Example 4

A heat-radiating fluid composition was prepared in the same manner as in Example 1, except for using silicone oil (DMX 200F manufactured by Saehan silichem Corp.) instead of the soybean oil used in Example 1 above. The prepared heat-radiating fluid composition was phase-separated into the ethanol (density: 0.789 g/ml) at an upper part thereof and into the silicon oil (density: 0.917 g/ml, Hansen solubility parameter: 16 MPa$^{1/2}$) at a lower part thereof, and the viscosity of the composition was 450 cP at 20□ and 300 cP at 30□.

Example 5

A heat-radiating fluid composition was prepared in the same manner as in Example 1, except for using propane-1, 2-diol (Hansen solubility parameter: 30.2 MPa$^{1/2}$) instead of the acetonitrile used in Example 1 above. The viscosity of the prepared heat-radiating fluid composition was 520 cP at 20□ and 400 cP at 30□.

Example 6

A heat-radiating fluid composition was prepared in the same manner as in Example 1, except for using 70 parts by weight of ethanol instead of the 50 parts by weight of ethanol, using hollow silica particles (manufactured by LG Chem Corp.), of which a primary average particle diameter is 2 μm and a diameter of hollows is 800 nm, instead of the hollow silica particles, of which a primary average particle diameter is 1 μm and a diameter of hollows is 600 nm, and using 50 parts by weight of acetonitrile instead of the 30 parts by weight of acetonitrile as used in Example 1. The viscosity of the prepared heat-radiating fluid composition was 400 cP at 20□ and 250 cP at 30□.

Comparative Example 1

In order to carry out a comparative experiment with a general heat-radiating fluid, FR-3 (manufactured by Cargill Corp.), of which main component is vegetable oil (V-oil) often used as an insulating oil, was used instead of the heat-radiating fluid composition used in Example 1 above, and hollow inorganic particles and the first and second fluids were not used.

Comparative Example 2

A heat-radiating fluid composition was prepared in the same manner as in Example 1, except for using 300 parts by weight of ethanol instead of the 50 parts by weight of ethanol and using 150 parts by weight of acetonitrile instead of the 30 parts by weight of acetonitrile used in Example 1 above.

Comparative Example 3

A heat-radiating fluid composition was prepared in the same manner as in Example 1, except for using 3 parts by weight of ethanol instead of the 50 parts by weight of ethanol and using 5 parts by weight of acetonitrile instead of the 30 parts by weight of acetonitrile used in Example 1 above.

Comparative Example 4

A heat-radiating fluid composition was prepared in the same manner as in Example 1, except for using 70 parts by weight of hollow silica particles (manufactured by LG Chem Corp.), of which a primary average particle diameter is 100 nm and a diameter of hollows is 50 nm, instead of the 30 parts by weight of hollow silica particles, of which a primary average particle diameter is 1 μm and a diameter of hollows is 600 nm, and using 70 parts by weight of acetonitrile instead of the 30 parts by weight of acetonitrile used in Example 1 above.

Comparative Example 5

A heat-radiating fluid composition was prepared in the same manner as in Example 1, except for using 30 parts by weight of general silica particles (7000GR manufactured by JSI Silicone Corp.) having no hollow instead of the 30 parts by weight of the hollow silica particles, of which a primary average particle diameter is 1 μm and a diameter of hollows is 600 nm, used in Example 1 above.

Comparative Example 6

A heat-radiating fluid composition was prepared in the same manner as in Example 1, except for using 50 parts by weight of t-butanol, which is not phase-separated from soybean oil, instead of the 50 parts by weight of ethanol used in Example 1 above.

Comparative Example 7

A heat-radiating fluid composition was prepared in the same manner as in Example 1, except for using 30 parts by weight of pyridine (Hansen solubility parameter: 21.8 MPa$^{1/2}$), which is immiscible with ethanol, instead of the 30 parts by weight of acetonitrile used in Example 1 above.

Comparative Example 8

A heat-radiating fluid composition was prepared in the same manner as in Example 1, except for using 3 parts by weight of silica instead of the 30 parts by weight of silica used in Example 1 above.

Experimental Examples

Dispersion stability and heat-radiating property of the heat-radiating fluid compositions prepared in Examples 1 to 6 and Comparative Examples 1 to 7 above were measured, respectively, by the following method, and the results thereof are shown in the following Table 1. Further, the content of materials described in the following Table 1 is based on 100 parts by weight of the non-conductive oil.

1) Dispersion stability (%): After pouring 150 g of the prepared heat-radiating fluid composition into a mass cylinder, a maximum height of a layer of particles at the time of pouring was assumed to be 100. Then, the dispersion stability was represented as a ratio of a maximum height of a layer of precipitated particles after 30 days relative to the above maximum height in percentage.

2) Heat-radiating property: As shown in FIG. 1, a temperature line was attached to a case of a battery module and inside a battery cell, after which a prepared heat-radiating fluid composition was filled up to 80% of an internal height of the module case, then charged with a constant current at 25□ until a voltage reached 50V for 0.5 hours, then subjected to a resting period for two hours, and then discharged with a constant current until a voltage reached 50V again for 0.5 hours, so that temperatures inside the battery module were recorded. Out of these temperatures measured, a highest temperature inside the battery module was shown in Table 1.

Further, a heat-radiating fluid composition prepared for the battery module was filled up to 30% of an internal height of the module case, and then charged and discharged by the same method above, so that a highest temperature inside the battery module was shown in Table 1.

Figure 3:
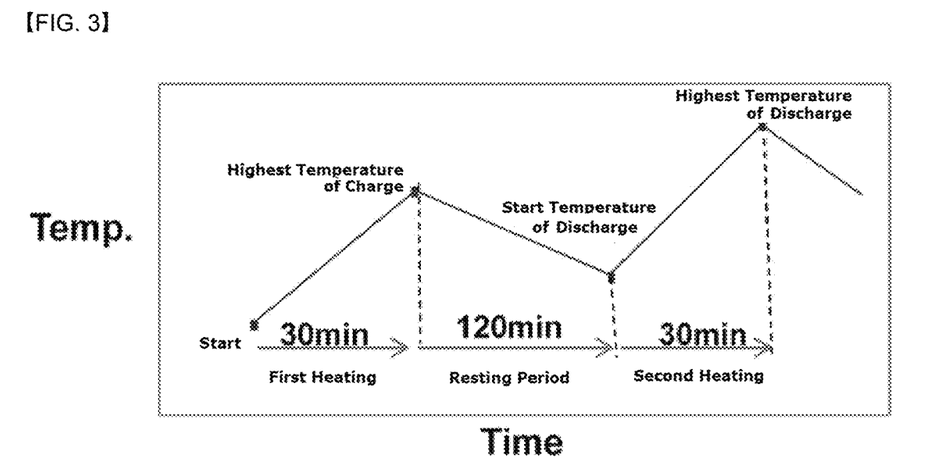
FIG. 3 is a graph schematically showing a temperature change of a battery cell during charge and discharge according to one example.

At that time, a change in temperatures inside the battery cell during charge and discharge of the battery module was schematically shown in FIG. 3. Referring to FIG. 3, it may be seen that the battery cell was heated during charge to reach a highest temperature of charge, and then cooled down during a resting period without any charge and discharge, after which a temperature of the battery cell rose again during discharge to reach a highest temperature of discharge in a pre-determined period of time later. Thus, it may be seen whether or not the heat-radiating fluid composition has rapidly released the heat generated from the battery cell during charge and discharge by identifying a highest temperature inside the battery cell such as a highest temperature of charge and a highest temperature of discharge. Accordingly, the heat-radiating property was confirmed by measuring a highest temperature of discharge in the present experimental example.

TABLE 1

|  | Non-conductive oil | First fluid (content) | Second fluid (content) | Hollow inorganic particles (content) | Dispersion stability (%) | Highest temp. (□) of battery module with composition filled 80% | Highest temp. (□) of battery module with composition filled 30% |
|---|---|---|---|---|---|---|---|
| Example 1 | Soybean oil | Ethanol (50) | Acetonitrile (30) | Silica (30) | 100 | 47 | 49 |
| Example 2 | Soybean oil | Ethanol (50) | Acetonitrile (30) | Alumina (30) | 100 | 46 | 48.5 |
| Example 3 | Soybean oil | 2-propanol (50) | Acetonitrile (30) | Silica (30) | 100 | 47.4 | 49 |
| Example 4 | Silicon oil | Ethanol (50) | Acetonitrile (30) | Silica (30) | 95 | 49 | 52 |
| Example 5 | Soybean oil | Ethanol (50) | Propane-1,2-diol (30) | Silica (30) | 100 | 48.1 | 49.5 |
| Example 6 | Soybean oil | Ethanol (70) | Acetonitrile (50) | Silica (30) | 100 | 47 | 49.3 |
| Comp. Example 1 | V-oil | — | — | — | — | 57 | 60 |
| Comp. Example 2 | Soybean oil | Ethanol (300) | Acetonitrile (150) | Silica (30) | 50 | 51 | 54.3 |
| Comp. Example 3 | Soybean oil | Ethanol (3) | Acetonitrile (5) | Silica (30) | 80 | 53.5 | 55.6 |
| Comp. Example 4 | Soybean oil | Ethanol (50) | Acetonitrile (70) | Silica (70) | 80 | 53 | 54.3 |
| Comp. Example 5 | Soybean oil | Ethanol (50) | Acetonitrile (30) | General silica (30) | 30 | 54 | 55.5 |
| Comp. Example 6 | Soybean oil | t-butanol (50) | Acetonitrile (30) | Silica (30) | 10 | 52 | 54 |
| Comp. Example 7 | Soybean oil | Ethanol (50) | Pyridine (30) | Silica (30) | 10 | 52.7 | 54.1 |
| Comp. Example 8 | Soybean oil | Ethanol (50) | Acetonitrile (30) | Silica (3) | 100 | 53 | 55.5 |

Referring to Table 1, it may be confirmed that the battery module of Example using the heat-radiating fluid composition according to the present disclosure achieved not only an excellent dispersion stability but also an excellent heat-radiating property compared to the battery module of Comparative Example 1 using a conventional heat-radiating fluid, and the battery modules of Comparative Examples 2 to 8 using the compositions beyond the range of the present disclosure.

The invention claimed is:
1. A heat-radiating fluid composition comprising:
a non-conductive oil;
5 to 200 parts by weight of a first fluid having a dielectric constant of 45 or less; and
5 to 50 parts by weight of hollow inorganic particles, based on 100 parts by weight of the non-conductive oil,
wherein the non-conductive oil and the first fluid are phase-separated.

2. The heat-radiating fluid composition of claim 1,
wherein the heat-radiating fluid composition further comprises a second fluid which is miscible with the first fluid, and
at least a part of the second fluid is located in hollows of the hollow inorganic particles.

3. The heat-radiating fluid composition of claim 1,
wherein the non-conductive oil is at least one selected from the group consisting of mineral oil, silicone oil and vegetable oil.

4. The heat-radiating fluid composition of claim 1,
wherein the first fluid is ethanol, 2-propanol, or 2-methylpropanol.

5. The heat-radiating fluid composition of claim 1,
wherein the first fluid has a density lower than a density of the non-conductive oil.

6. The heat-radiating fluid composition of claim 1,
wherein the hollow inorganic particles are at least one selected from the group consisting of silica (excluding fumed silica), alumina (excluding fumed alumina), aluminosilicate, aluminum nitride (AlN), silicon nitride ($Si_3N_4$) and boron nitride (BN).

7. The heat-radiating fluid composition of claim 1,
wherein the hollow inorganic particles have a primary average particle diameter of 300 nm to 5 μm, and the hollows thereof have a diameter of 50 nm to 4 μm.

8. The heat-radiating fluid composition of claim 2,
wherein the second fluid is acetonitrile, propane-1,2-diol or 1-octanol.

9. The heat-radiating fluid composition of claim 1,
wherein the heat-radiating fluid composition has a dispersion stability of 90% or more, and
the dispersion stability is a ratio of a maximum height of a layer of settled particles after 30 days relative to a maximum height of a layer of particles at the time of pouring a certain amount of the heat-radiating fluid composition into a mass cylinder, in percentage.

10. A method for preparing a heat-radiating fluid composition, comprising:
   (a) preparing a first mixture by mixing a non-conductive oil and 5 to 200 parts by weight of a first fluid having a dielectric constant of 45 or less, based on 100 parts by weight of the non-conductive oil;
   (b) preparing a second mixture by stirring 5 to 50 parts by weight of hollow inorganic particles and 10 to 100 parts by weight of a second fluid which is miscible with the first fluid, based on 100 parts by weight of the non-conductive oil; and
   (c) mixing the second mixture into the first mixture, so that a sum of the hollow inorganic particles and the second fluid is 10 to 100 parts by weight, based on 100 parts by weight of the non-conductive oil,
wherein the non-conductive oil and the first fluid are phase-separated.

11. The method for preparing a heat-radiating fluid composition of claim 10,
wherein in (b), the stirring is performed with a ball mill and at least a part of the second fluid enters into the hollows of the hollow inorganic particles by means of the stirring.

12. A battery module comprising:
a module case;
a battery cell mounted inside the module case; and
the heat-radiating fluid composition according to claim 1 filled in the module case.

13. The battery module of claim 12,
wherein the heat-radiating fluid composition is filled up to 90% or less of an entire height inside the module case.

14. The battery module of claim 12,
wherein the module case is aluminum, plastic, stainless steel, or a combination of two or more thereof.

15. The battery module of claim 12,
wherein the battery cell has a maximum voltage of less than 65V.

16. A battery pack comprising:
at least two battery modules according claim 12; and
a pack case accommodating the battery module.

* * * * *